United States Patent

[11] 3,596,816

| [72] | Inventor | Claude V. Brown<br>Bartlesville, Okla. |
|---|---|---|
| [21] | Appl. No. | 821,856 |
| [22] | Filed | May 5, 1969 |
| [45] | Patented | Aug. 3, 1971 |
| [73] | Assignee | Phillips Petroleum Company |

[54] FIBRILLATION METHOD
8 Claims, 2 Drawing Figs.

[52] U.S. Cl................................................... 225/2,
28/DIG. 1, 225/3, 225/96
[51] Int. Cl................................................... B26f 3/02
[50] Field of Search............................................. 225/2, 3,
93, 96, 96.5; 57/34; 28/1 F

[56] References Cited
UNITED STATES PATENTS

| 3,378,997 | 4/1968 | Matsui et al. | 57/34 |
| 3,424,358 | 1/1969 | Robinson et al. | 225/3 |
| 3,273,329 | 9/1966 | Scragg | 28/1 (F) UX |
| 3,273,771 | 9/1966 | Beaumont | 225/97 X |
| 3,302,501 | 2/1967 | Greene | 28/1 (F) UX |
| 3,395,525 | 8/1968 | Eddy | 225/3 UX |
| 3,416,772 | 12/1968 | Sheehan | 225/3 |

*Primary Examiner*—Frank T. Yost
*Attorney*—Young and Quigg

ABSTRACT: A method for fibrillating an oriented film or thermoplastic material. The method includes forming elongate lines of weakness in the film and mechanically working the weakened film to promote the splitting up along the lines of weakness.

PATENTED AUG 3 1971          3,596,816
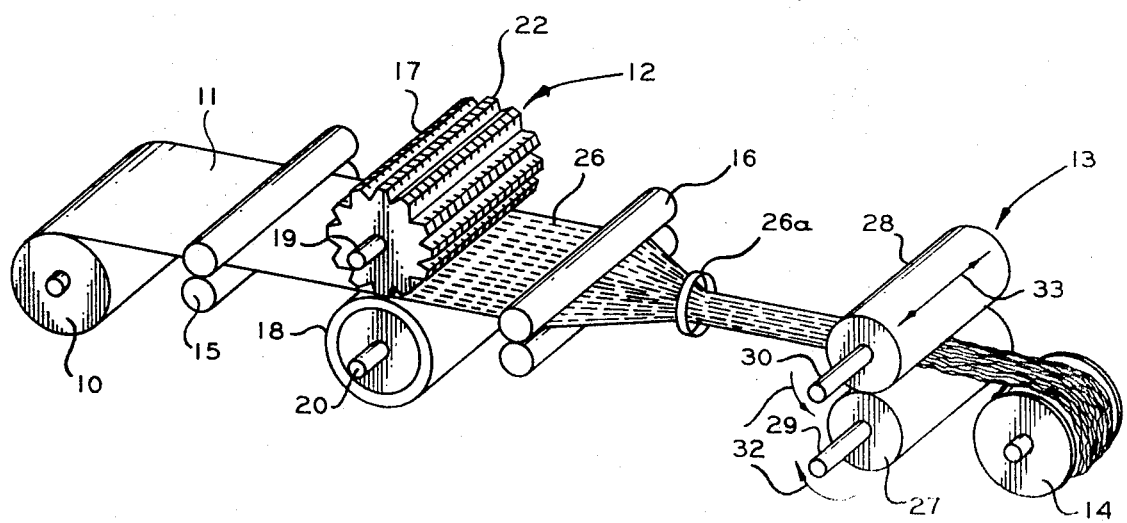
FIG. I
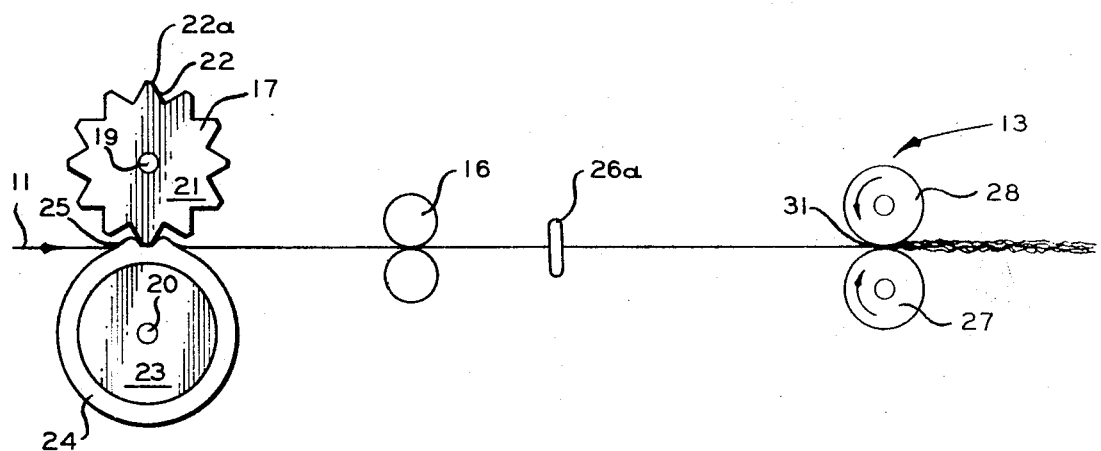
FIG. 2
INVENTOR.
C.V. BROWN
BY *Young and Quigg*
ATTORNEYS

FIBRILLATION METHOD

BACKGROUND AND SUMMARY OF THE INVENTION

This invention relates to a method of fibrillating a film of thermoplastic material.

The conventional process for making a fibrous material from polymer resin involves extruding a thermoplastic, orientable polymer to form a thin film; stretching the film to orient the long molecular chains; and imparting a stress on the film transverse the direction of orientation. The transverse stress causes the film to fibrillate or split up forming a coherent network of stem fibers connected by cross fibers. The fibrous material finds application as a nonwoven fabric or, after twisting, as yarn.

The fibrillation process operates on the phenomenon that the polymer upon being oriented exhibits high longitudinal strength and low transverse strength relative the direction of orientation. However, for polymers that do not demonstrate sufficiently low transverse strength attendant to orientation, or for polymers having a low degree of orientation, the conventional processes are not effective to cause satisfactory splitting up of the film. Either there is no splitting up or the degree of fibrillation is irregular so as to make the fibrous product unsatisfactory for use either as nonwoven fabric or yarn.

The transverse strength depends upon several factors, paramount of which are the type of polymer used, the degree of orientation, and the type of pretreatment of the film. Certain polymers, e.g., the polyamides, do not demonstrate the high degree of fissility when oriented because of cross-linking force between adjacent molecules and therefore are difficult to fibrillate. Furthermore, polymers which are not sufficiently oriented present high transverse strength which resist the applied forces. Still further, films of the thermoplastic material prepared by the water-quenched technique which precludes high degree orientation are characterized as tough, making them extremely difficult to fibrillate. In fibrillation it is desirable to have as thin a film as possible. It has been found that films prepared by the water-quenched technique cannot be oriented to as high a degree as films prepared by other techniques such as the blown-tubing technique. For example, a 1.5-mil-thick film of polypropylene prepared by water quenching can be oriented only to a ratio of about 6:1 before rupture occurs. The properties of the water-quenched film and the relatively low degree of orientation contribute substantially to the relatively high transverse strength of the film. Attempts to fibrillate the film described above by the presently known fibrillation methods have not been successful.

The purpose of the present invention is to provide a method for fibrillating thermoplastic material exhibiting a high transverse strength. The invention contemplates a two-stage treatment involving, first, creating longitudinal lines of weakness in the oriented film and, then, applying a transverse stress on the weakened film to promote the separation of the fibers along the lines of weakness. The precess is carried out by in-line equipment including rotary cutting and indenting means followed by a friction-type splitting-up apparatus. The cutting and indenting means includes a pair of counterrotating rollers, one provided with a plurality of radially extending cutting teeth and the other with a resilient periphery. The oriented film passes between the counterrotating rollers, the teeth operating to form slits and/or indentations therein, creating lines of weakness. The weakened film is then fed through a pair of oscillating rollers which work the film, thereby promoting the splitting-up along the lines of weakness.

DRAWINGS

FIG. 1 is a perspective view of the apparatus for carrying out the method of this invention;

FIG. 2 is an enlarged elevational view of the cutting means and the fibrillation apparatus.

DESCRIPTION OF THE PREFERRED EMBODIMENT

With reference to FIG. 1, a system for fibrillating a film of thermoplastic material is seen to include a supply roll 10 which feeds an oriented film 11 of a thermoplastic material successively through the cutting means 12 and the splitting-up mechanism 13, and finally to the takeup package 14 for subsequent disposition. Roller assemblies 15 and 16 serve to maintain planar alignment of the film 11 throughout the system.

In a continuous process wherein the supply roll is composed of unoriented film, the roller assembly 15 may be driven at a peripheral speed greater than the linear speed of film 11 so that film orientation occurs between the supply roll 11 and roller assembly 15.

The cutting means 12 includes a cutting roller 17 and a backup roller 18, both being journaled to their respective shafts 19 and 20 for freewheel movement thereon. As shown in FIG. 2, the cutting roller 17 has a cylindrical body 21 from which projects a plurality of cutting teeth 22. The teeth 22 are truncated providing a plurality of circumferentially spaced thin edges 22a which lie in a plane parallel to the direction of film movement and film orientation.

The backup roller 19 has an inner metal core 23 on which is mounted a hollow cylindrical sleeve 24 composed of resilient material such as rubber. The shafts 19 and 20 of the rollers 17 and 18, respectively, are arranged parallel to one another and radially spaced so that the confronting peripheral portions of each define a cutting zone indicated by 25. The spacing of the shafts 19 and 20 is such that the teeth 22 in passing through the cutting zone 25 imbed slightly in the resilient sleeve 24. Thus, as film 11 is passed through the cutting zone 25, the freewheeling cutting roller 17 is rotated by the action of the teeth 22 at least partially penetrating the film 11, while the backup roller 18 frictionally driven by the engagement of the film 11 thereon. Thus, it will be appreciated that the peripheral speed of the orbiting teeth 22 in passing through the cutting zone 25 will be at the same speed of the film 11 so that no shredding occurs. Because of the resilient backing provided by sleeve 24, the film 11, dependingon the toughness of the material used, may be depressed slightly into the backup roller 18 with only portions of edges 22a penetrating the film. Thus indentations in line with the slits and representing continuation thereof will be formed in the film 11. It is the combination of the slits and/or indentations which create the lines of weakness in the film 11. The film 11 in leaving the cutting zone 25 will have a plurality of elongate slits and/or indentations 26. The tooth density, of course, determines the number and spacing of the slits and/or indentations. While a wide range of tooth densities and tooth configurations is possible, preferably the tooth density should be in the range of about 50 to about 1,300 per square inch. The degree of fibrillation may be increased by passing the film 11 through the cutting zone several times before applying the frictional forces or, alternatively, by providing a series of cutting roller assemblies. The teeth 22 may have any configuration which imparts at least longitudinal indentations in the film 11. Preferably, the teeth 22 will have a triangular shape wherein the included angle between the leading and trailing edges is at least 60°, and a tooth thickness in the range of from about 5 mil to about 50 mil. The optimum tooth height will depend on the film thickness but should be from about 5 times to about 10 times the film thickness.

Following the cutting and/or indenting step, the film 11 having elongate indentation or slits 26 formed therein then passes through an eyelet 26a and the fibrillating mechanism shown generally as 13 which works the film to promote the fibrillation along the lines of weakness. The mechanism 13 comprises a pair of rollers 27 and 28 arranged on their respective shafts 29 and 30 so that their confronting peripheries define a fibrillating zone 31 (see FIG. 2). The rollers 27 and 28 can be driven to provide counterrotation as indicated by the arrows 32 and at least one of the rolls is oscillatable as indicated by the arrow 33. Alternatively, the rollers 27 and 28 can be freewheeling, the takeup package 14 being driven to provide the force for moving the film between rollers 27 and 28. In the freewheeling arrangement, the rollers 27 and 28 are rotated as indicated by arrows 32 by frictional engagement on the film passing therebetween. The rollers 27 and 28 are constructed of hard rubber and have smooth outer peripheries so that the oscillating movement in a direction transverse the direction of film movement and of molecular orientation applies a transverse stress thereto. Now, since the slits and/or indentations 26 have created lines of weakness parallel to the oriented molecules, the frictional working imparted by rollers 27 and 28 promotes the fibrillation of the film 11 to produce the fibrous material. Depending on the tooth configuration and arrangement, the fibrous material produced may exhibit a randomly interconnected pattern or a uniform reticulated pattern. The degree of fibrillation will depend upon several factors which include type of polymer used, degree of orientation, tooth density and configuration, pressure in the fibrillating zone 31, the frequency of oscillation, and the stroke of oscillation. Following the fibrillation step, the fibrillated film 11 may be rolled on takeup package 14 or twisted to form a strand of yarn.

It has been found that if elongate slits are formed in the film prior to passing the film through the oscillating rollers 27 and 28, the final product is characterized as a reticulated uniform network having a delustered sheen and a hand approaching that of natural fibers. The elongate slits can be cut in the film by a single cutting roller 17 without the backup roller 18. By driving the cutting roller 17 at a peripheral speed different than the linear speed of the film 11 through the zone 25, the leading or trailing edges of the teeth 22 form elongate slits in the film 11. Now when the film is bunched through eyelet 26a and then passed through the zone 31, the split product issuing therefrom is a bulked uniformly reticulated yarn exhibiting a luster and hand similar to natural fibers.

Generally, any orientable plastic film which exhibits high transverse strength can be employed in this process. As pointed out previously, the degree of orientation is not as critical in the process of this invention as that required in the prior art processes. The film can be oriented in any conventional manner well known in the art such as supercooling the film 11 and then orienting the same by stretching and the like or heating the film 11 to a temperature below that at which the film is in the molten state and then stretching same.

While most any orientable plastic film (e.g., nylon, polyesters, polyvinyl alcohol, arcrylic polymers, polyvinyl chloride, polyvinyl acetate, polyvinylidene chloride, and the like) can be employed in this invention, polymers of the 1-olefins having from 2 to 8 carbon atoms are preferred.

The film 11 can be of any length and width and substantially any thickness, the minimum thickness of the film being only that which will produce a substantially self-sustaining film and the maximum thickness being that which can be accommodated by the cutting means 13 and fibrillating mechanism 14. Preferably, the thickness of the film will vary from 0.5 to 6 mils.

In summary then, this invention comprises the steps of forming slits and/or indentations in an oriented thermoplastic material thereby creating lines of weakness and frictionally working the weakened film in a direction transverse that of the orientation. A variety of devices are available for performing either of the steps. The distinguishing feature of this invention is then to form elongated slits and/or indentations which create lines of weakness in the film thereby enhancing the ability of the film to be filbrillated. It has been found that by performing the fibrillation of the material in the two steps as described, the fibrous material produced exhibits a uniform degree of fibrillation.

EXAMPLE

A 1.5-mil-thick 1-inch-wide film of polypropylene having a melt flow of from 2.5 to 4 (ASTM 1238-62T, Condition L grams/10 minutes) and a flexural modulus equal to or greater than 200,000 (ASTM D 790-63, 73° F., p.s.i.) was the base material used.

The film was prepared by the water-quenched technique. It was oriented at a stretch ratio of 5:1 at 270° F. to give a ribbon about 0.75 mil in thickness.

The oriented film was fed 50 feet per minute through the cutting and indenting means of FIG. 1, wherein the roller 17 was provided with a tooth density of 300 per square inch. Each tooth had an included angle of 60° per thickness of 20 mils, at the base and bevelled to 5 mils at the tip, and a height of 7.5 mils. The material leaving zone 25 had a plurality of elongate slits and/or indentations about 45 mils in length.

The film passing through the eyelet was bunched before entering the fibrillation zone 30 of the oscillating rollers 27 and 28. The film speed was 50 feet per minute, and the rollers were oscillated at 1,200 strokes per minute at a stroke of about 1.5 inches.

The fibrous material leaving the fibrillating zone 29 had a generally uniform network structure and the degree of fibrillation was substantially the same throughout the material.

While this preferred embodiment has been described in particular detail, it should be understood that variations and modifications may be made therein without departing from the scope and spirit of this invention as set forth in the appended claims.

I claim:

1. A method for fibrillating an oriented film of thermoplastic material comprising the steps of:
   mechanically forming elongated lines of weakness in said film according to a predetermined pattern, said lines of weakness extending substantially parallel to the direction of orientation with each of said lines of weakness comprising at least one indention line on a surface of the film;
   forming elongated slits through the film with each slit abutting at least one of the lines of indention of the film; and
   applying a stress to said film having elongated lines of weakness and splitting the film along said lines thereby forming uniformly fibrillated material.

2. The method as recited in claim 1 wherein said thermoplastic material is composed of a polymer of 1-olefins, and said film is prepared by a water-quenching technique.

3. The method as recited in claim 2 wherein said polymer is polypropylene and the orientation of said water-quenched film of polypropylene is about 5:1 or less.

4. A method, as set forth in claim 1, wherein the film prior to stressing has a plurality of lines of weakness each having a length of at least 50 mils.

5. A method for fibrillating an oriented film of thermoplastic material comprising:
   mechanically forming elongated lines of weakness in said film according to a preselected pattern, said lines of weakness extending substantially parallel to the direction of orientation with each of said lines of weakness comprising at least one indention line on a surface of the film; and
   applying a stress to said film having elongated lines of weakness in a direction transverse the direction of orientation with said stress being applied by frictionally working the film by oscillating the film in a direction transverse the direction of orientation of the film.

6. The method as recited in claim 5 wherein said thermoplastic material is composed of a polymer of 1-olefins, and said film is prepared by a water-quenching technique.

7. The method as recited in claim 6 wherein said polymer is polypropylene and the orientation of said water-quenched film of polypropylene is about 5:1 or less.

8. A method, as set forth in claim 5, wherein the film prior to stressing has a plurality of lines of weakness each having a length of at least 50 mils.

Disclaimer and Dedication 3,596,816.—*Claude V. Brown*, Bartlesville, Okla. FIBRILLATION METHOD. Patent dated Aug. 3, 1971. Disclaimer and dedication filed Dec. 28, 1971, by the assignee, *Phillips Petroleum Company*.

Hereby disclaims said patent and dedicates to the Public the remaining term of said patent.

[*Official Gazette April 11, 1972.*]